United States Patent

[11] 3,612,891

[72] Inventors Truman L. Ward
New Orleans;
Ralph J. Berni, Metairie; Julius R. Jung, Jr., New Orleans; Ruth R. Benerito, New Orleans, all of La.
[21] Appl. No. 886,922
[22] Filed Dec. 22, 1969
[45] Patented Oct. 12, 1971
[73] Assignee The United States of America as represented by the Secretary of Agriculture

[54] DEVICE FOR TESTING FOR "FROSTING" IN FABRICS
3 Claims, 6 Drawing Figs.
[52] U.S. Cl. .................................................... 250/222,
250/219 F, 73/7, 26/28
[51] Int. Cl. .................................................... G01n 3/56
[50] Field of Search .......................................... 250/211, 219 I, 219 F, 221, 222; 356/209–212; 73/7; 26/29 P, 28

[56] References Cited
UNITED STATES PATENTS

| | | | |
|---|---|---|---|
| 2,127,477 | 8/1938 | Carpenter et al. | 356/209 |
| 2,315,282 | 3/1943 | Snow | 356/211 |
| 2,423,704 | 7/1947 | Hood | 73/7 |
| 2,547,545 | 4/1951 | Strong | 356/209 |
| 2,701,356 | 2/1955 | Coleman | 356/212 |
| 3,065,627 | 11/1962 | Ros | 73/7 |
| 3,388,259 | 6/1968 | Flower | 356/212 |
| 3,432,671 | 3/1969 | Edmonds | 250/211 |

*Primary Examiner*—Walter Stolwein
*Attorneys*—R. Hoffman and W. Bier

ABSTRACT: "Frosting" on dyed fabrics, which indicates abrasive wear, is measured by abrading a rotating sample of fabric in a closed chamber, illuminating the abraded area, and scanning the illuminated area with a photoelectric sensing device. The signal generated by the latter is fed into recording means. Graphic evaluation of a plurality of fabrics compares favorably with subjective evaluation of the same fabrics by accepted methods. Reproducibility of measurement is excellent.

INVENTORS
TRUMAN L. WARD, RALPH J. BERNI
JULIUS R. JUNG, JR., RUTH R. BENERITO

BY
*R. Hoffman*
ATTORNEY

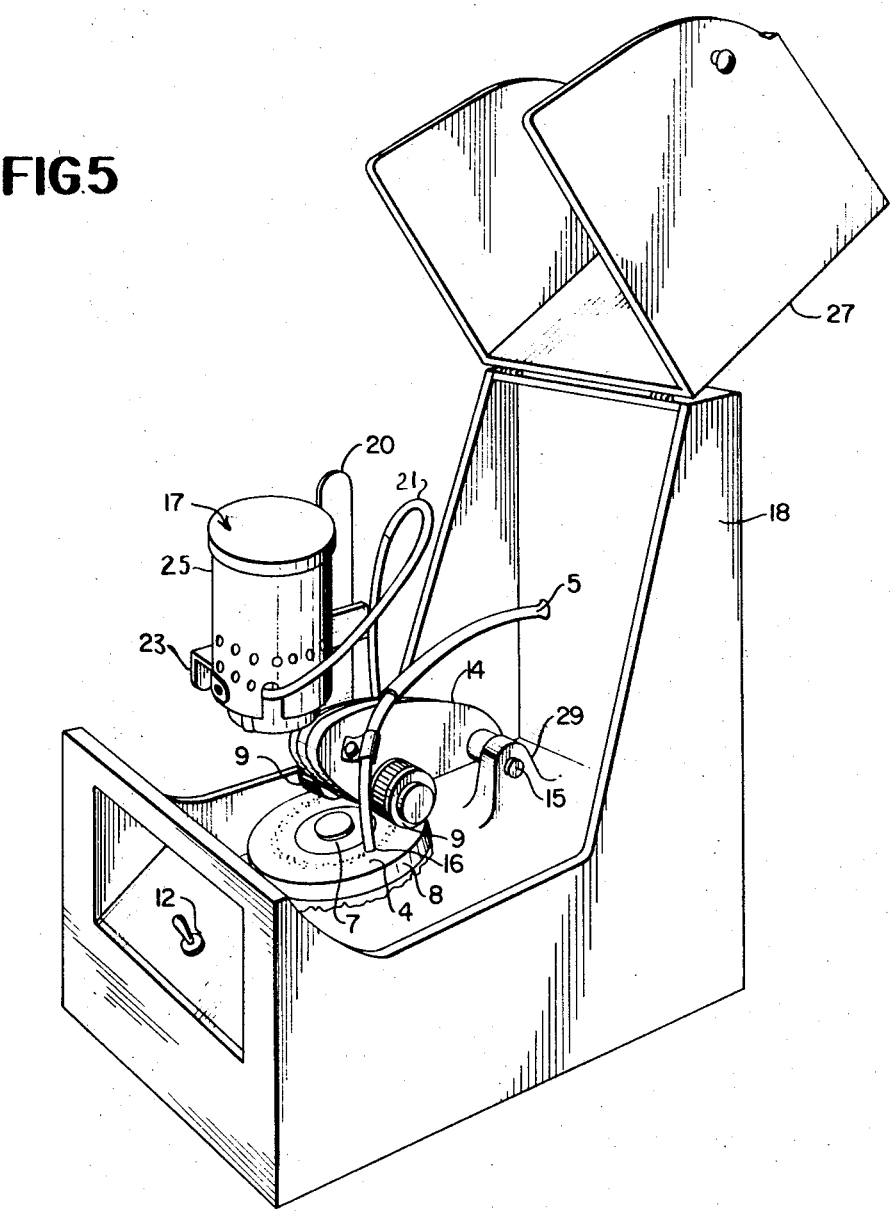

DEVICE FOR TESTING FOR "FROSTING" IN FABRICS

A nonexclusive, irrevocable, royalty-free license in the invention herein described throughout the world for all purposes of the United States Government, with the power to grant sublicenses for such purposes, is hereby granted to the Government of the United States of America.

This invention relates to a device for measuring "frosting" in dyed fabrics. The term "frosting" is used in textile testing to determine the resistance to abrasion which may have been imparted to a fabric. "Differential wear" or "fibrillation" of a fabric produces this "frosting." Change in fabric color or shade caused by localized abrasive wear is generally the manifestation of the breakage of dyed fibers. When the dyeing is mainly on the surface of a fiber the undyed cross section tends to fray at the end where abrasion has caused breakage, and when enough of these frayed ends are viewed at armslength there is a "frosty" appearance. If the dyeing is within as well as on the surface of a fiber the abraded portion of a fabric of such nature tends to produce a darker "frosting". The device and method of this invention provide a means for measuring the amount of abrasion by correlating the light reflectance with such abrasion. The reflectance can be read through an ordinary reflectometer or it can be fed to a recording device in order to obtain a graphic representation, and a correlation of *wear* against *number of cycles* required to obtain a certain amount of abrasion. This data can in turn be used comparatively against another similar fabric to determine whether a certain dyeing is efficient, whether a certain dye is suitable, a certain temperature, a certain fabric construction, or whether a certain blend should be attempted before large quantities are produced.

Well-known and accepted subjective methods for measuring frosting are described in Tentative Test Methods 119-1967 and 120-1967 of the American Association of Textile Chemists and Colorists Technical Manual 43 (1967). These methods were considered acceptable by the various textile industries for many years. As the art of textile dyeing advanced it became imperative to institute more accurate and precise ways of processing. Fast and repetitive means of quality and quantity controls must be instituted to keep pace with the demands of the economy. This invention provides a means of fulfilling these needs.

The main object of this invention is to provide a means and method of obtaining objective evaluation of the resistance dyed fabric samples to frosting during flat abrasion.

A second object of the instant invention is to provide a less subjective means of rapidly and repetitively evaluating the performance of fabrics under flat abrasion testing while the testing is still in operation.

The above objects are achieved by adapting a commercially available flat abrader unit for use with a reflectance measuring unit.

The method itself consists of abrading a rotating dyed fabric sample and continuously monitoring the results of abrasion by employing a photoelectric cell in conjunction with a galvanometer or a continuous recording means. The degree of frosting is then measured as the frosting is being produced. Known methods employ static evaluation after completion of the abrasion rather than during the abrasion.

In general, this invention comprises a light-tight chamber in which are enclosed a rotating abrading unit adapted to be brought into contact with a sample of dyed fabric secured to a rotatable flat turntable. A reflectance unit, which comprises a source of light and a photoelectric sensing device, is also enclosed within the light-tight chamber. This reflectance unit is so located that it can be swung into position to illuminate the abraded area of the sample. Light reflected from the sample is intercepted by the photoelectric sensing means which generates a signal whose intensity is a function of the reflected light. The generated signal may be measured by an externally connected galvanometer or it may be directed to an externally connected recording device which will produce a permanent, continuous chart of the signal strength variations during the course of an abrading test. A suction tube, connected to an external source of vacuum, is mounted in proximity to the fabric surface being abraded to remove lint.

In order that the invention may be more readily understood, reference is made to the following detailed description and to the accompanying drawings in which:

FIG. 5 shows the completely assembled device with a test fabric in place and the abrading means and illuminator in position for operation.

Figure 1:
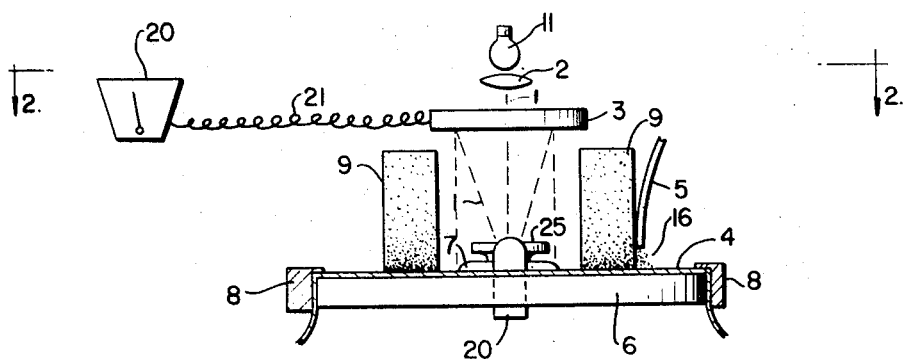
FIG. 1 is an elevation, with the container removed, schematically showing the relative placement of the essential elements of the apparatus.
Figure 2:
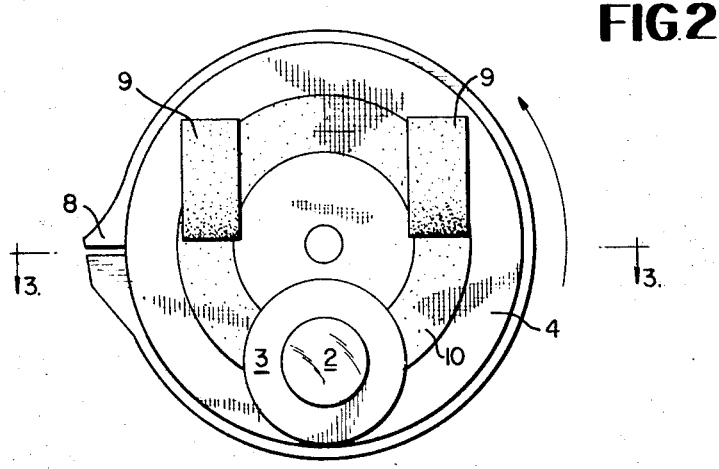
FIG. 2 is a top view as observed from plane 2—2 of FIG. 1.

As particularly shown in FIGS. 1 and 2, light rays 1 from lamp 11 are converged by condensing lens 2 and made to pass through center of photocell 3. The light strikes the dyed fabric 4, which is kept free of lint by vacuum provided through vacuum line 5 placed at about from 1 to 10 millimeters distance from the surface of the fabric sample to be abraded. The light rays 1 striking the abraded part of the surface of the fabric 4 are reflected into photocell 3 where light energy is converted to electrical energy and read either as a unit of electricity on the face of galvanometer 20, connected in a known manner to photocell 3 by means of line 21. If desired, a permanent record of variations in reflected light can be obtained as a graphical presentation by substituting a conventional XY recorder (not shown) in a manner well known to those skilled in the art. The circular fabric specimen 4 is held in place on turntable 6 by concentric plate 7 (about 1½ inches in diameter), fastened by thumbscrew 30 and by ring clamp 8 around the turntable.

Figure 6:
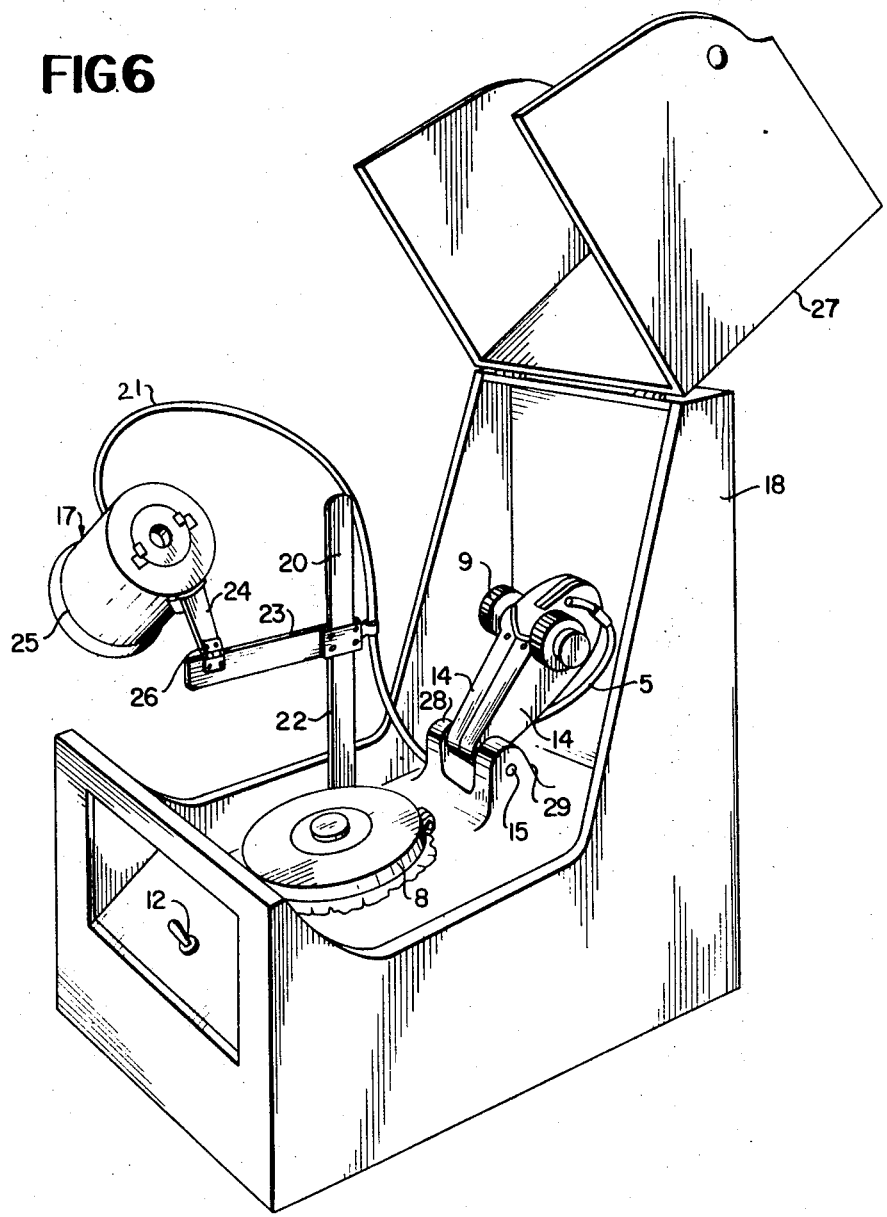
FIG. 6 shows the device as in FIG. 5, except that the abrading and illuminating means are retracted.

Frosting of the dyed textile specimen (or sample) is accomplished by rotating the fabric sample under and against abrasion wheels 9, which abrade, and thereby frost, a concentric circular path 10. The number of complete rotations of the turntable 6 is monitored by means of a resettable cycle counter (not shown). Toggle switch 12 (FIGS. 4,5, and 6) controls the electrical power to the turntable 6. The abrasion wheels 9 and photocell holder 25 may be tilted out of the way, as shown in FIG. 6, to facilitate the changing of fabric samples. Abrasion wheel support arms 14 must also be lifted away from contact with the fabric surface 4 in order to either place or remove the fabric sample. The abrasion wheel support arms 14 move out of the way by pivoting on pin 15, mounted in brackets 28 and 29.

Figure 4:
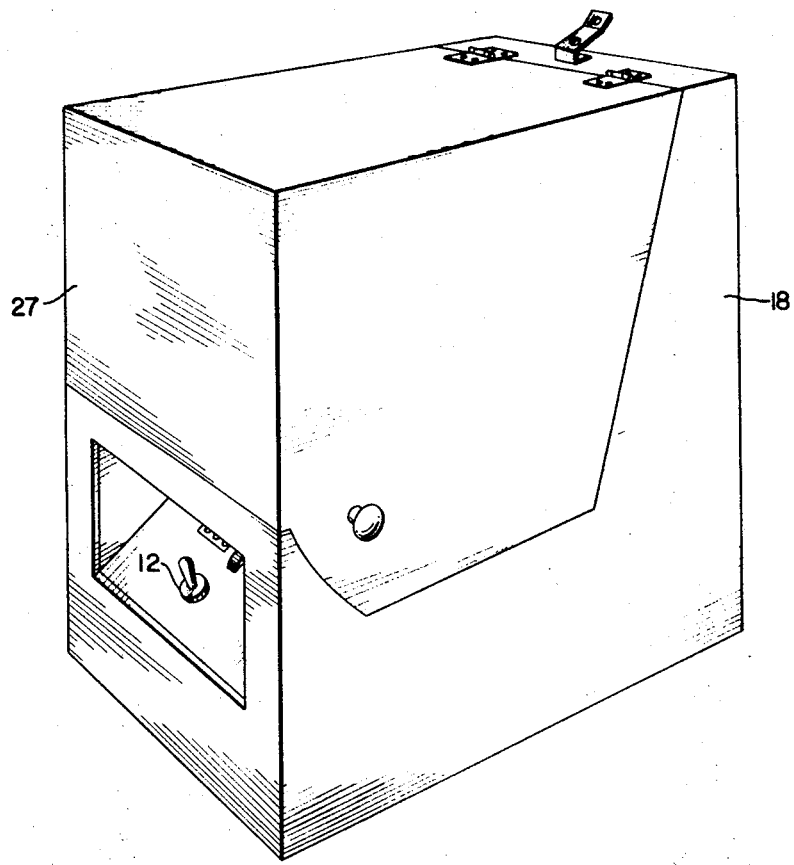
FIG. 4 is an overall perspective view of the device shown with the (over closed and showing the location of the control switch.
Figure 3:
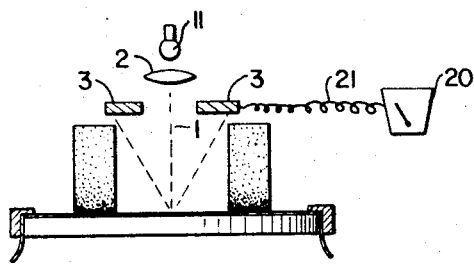
FIG. 3 is an auxiliary schematic sectional elevation, taken on line 3—3 of FIG. 2.

The photocell 3 receives primarily diffuse reflected light from a frosted area about 1½ square centimeters rather than a point source, and it is essential that the sample be kept free of lint. Lint 16 is removed as it is being produced by the abrasive action of the instrument on the fabric surface 4 by vacuum line 5 which is connected to a vacuum producing source (not shown). FIGS. 4, 5, and 6 show, respectively, the assembled instrument closed, open but otherwise ready for operation, and with the abrader and illuminating units swung away. Toggle switch 12 is shown in the closed chamber of FIG. 4. These figures also illustrate pictorially how the photocell assembly 17 may be tilted, and how the abrasion wheel support arms 14 can be lifted so that the fabric sample 4 can be removed by removing the concentric plate 7 and the ring clamps 8 which hold the sample in place.

An account of further uses of the above-described instrument has been published by the present applicants in the paper entitled "An Instrument for the Measurement of Frosting" in Textile Chemists and Colorists, Vol. 1, No. 1, (Jan. 15, 1969).).

We claim:

1. A method for measuring abrasion resistance of fabrics which comprises:

a. providing a sample of fabric dyed with a nonreactive dye;
b. continuously abrading the surface of said dyed fabric in an enclosed, light-tight environment;
c. continuously removing generated lint from the surface of the fabric being abraded;
d. simultaneously illuminating said surface to produce a diffused reflection; and
e. measuring the intensity of said diffused reflection to provide an indication of the extent to which dyed fibers were removed from the surface of the fabric during abrasion.

2. Apparatus for measuring abrasion resistance of fabrics comprising a light-tight enclosure and, mounted within said enclosure:
a. a flat rotatable platform;
b. means for rotating said platform connected thereto;
c. means for securing a fabric sample to the platform;
d. abrading means pivotally mounted in proximity to the rotatable platform said abrading means being positionable to be in contact with the surface of a sample of fabric secured to said rotatable platform;
e. illuminating means mounted in proximity to said rotatable platform so positioned as to direct light at the surface of a fabric sample secured to said platform;
f. photosensitive means also in proximity to said platform for receiving diffused reflected light from the surface of a fabric sample being abraded and for generating an electric signal which is a function of the intensity of the reflected light; and
g. means connected to said photosensitive means for recording the generated electrical signal.

3. The apparatus of claim 5 wherein means are provided for continuously removing lint from the surface of the fabric during abrasion.